US012655682B2

(12) United States Patent
Claase

(10) Patent No.: US 12,655,682 B2
(45) Date of Patent: Jun. 16, 2026

(54) WINDOW DRESSING SYSTEM AND ASSEMBLY

(71) Applicant: GECKO GLAZING LTD., Edinburgh (GB)

(72) Inventor: Gareth Claase, Edinburgh (GB)

(73) Assignee: GECKO GLAZING LTD., Edinburgh (GB)

( * ) Notice: Subject to any disclaimer, the term of this patent is extended or adjusted under 35 U.S.C. 154(b) by 221 days.

(21) Appl. No.: 18/556,745

(22) PCT Filed: Apr. 22, 2022

(86) PCT No.: PCT/EP2022/060718
§ 371 (c)(1),
(2) Date: Oct. 23, 2023

(87) PCT Pub. No.: WO2022/223793
PCT Pub. Date: Oct. 27, 2022

(65) Prior Publication Data

US 2024/0240515 A1 Jul. 18, 2024

(30) Foreign Application Priority Data

Apr. 23, 2021 (GB) ...................................... 2105818

(51) Int. Cl.
*E06B 9/24* (2006.01)
*E06B 3/30* (2006.01)
*E06B 7/28* (2006.01)

(52) U.S. Cl.
CPC ................ *E06B 9/24* (2013.01); *E06B 3/307* (2013.01); *E06B 7/28* (2013.01)

(58) Field of Classification Search
CPC ... E06B 9/24; E06B 3/307; E06B 7/28; E06B 3/263
See application file for complete search history.

(56) References Cited

U.S. PATENT DOCUMENTS 2,691,193 A 10/1954 Wissinger
3,992,843 A * 11/1976 DiFazio .................. E06B 3/645 52/204.593

(Continued)

FOREIGN PATENT DOCUMENTS

AU 2011101215 A4 11/2011
AU 2013100776 A4 9/2013

(Continued)

OTHER PUBLICATIONS

Third Party Observations for GB2105818.5, mailed on Dec. 4, 2024.

(Continued)

*Primary Examiner* — Beth A Stephan
(74) *Attorney, Agent, or Firm* — Fresh IP PLC; Clifford D. Hyra; Aubrey Y. Chen

(57) ABSTRACT

Disclosed herein is a window dressing system and assembly for securing adjacent to a room-facing side of a glazing element fitted in a mounting recess formed by a window frame. The window dressing system includes: a panel, a spacer frame at least partially surrounding the periphery of the panel, the panel being secured thereon, and a conformable securer enveloping the spacer frame. A releasable engagement between the conformable secure means and at least part of the window frame secures the panel of the window dressing system at a spacing away (G) from the room-facing side of the glazing element.

20 Claims, 7 Drawing Sheets

(56) References Cited

U.S. PATENT DOCUMENTS

| | | | | | |
|---|---|---|---|---|---|
| 4,272,942 | A * | 6/1981 | Jackson | E06B 3/28 | 52/745.15 |
| 4,320,609 | A | 3/1982 | Abell | | |
| 4,351,137 | A * | 9/1982 | Enyart | E06B 3/28 | 52/656.5 |
| 4,409,758 | A | 10/1983 | Dickerson et al. | | |
| 4,441,290 | A * | 4/1984 | Abell | E06B 3/285 | 52/202 |
| 4,453,585 | A | 6/1984 | Ruggeberg, Sr. | | |
| 4,486,990 | A | 12/1984 | Bauch | | |
| 4,890,435 | A * | 1/1990 | Wilkening | E06B 3/685 | 52/456 |
| 5,806,256 | A | 9/1998 | Byrne | | |
| 6,052,957 | A | 4/2000 | Minnich | | |
| 9,353,567 | B2 | 5/2016 | Pardue et al. | | |
| 11,371,284 | B2 * | 6/2022 | Karolevitz | B60J 1/2094 | |
| 2013/0002518 | A1 | 1/2013 | Yang et al. | | |
| 2013/0025218 | A1 | 1/2013 | Pardue et al. | | |
| 2014/0144090 | A1 | 5/2014 | Rebman et al. | | |
| 2019/0284873 | A1 * | 9/2019 | Benzur | E06B 9/11 | |

FOREIGN PATENT DOCUMENTS

| | | | |
|---|---|---|---|
| BE | 898203 | A | 3/1984 |
| BE | 898203 | A1 | 3/1984 |
| DE | 2603512 | A | 8/1977 |
| DE | 2603512 | A1 | 8/1977 |
| EP | 0483056 | A1 | 4/1992 |
| EP | 4326967 | A1 | 2/2024 |
| FR | 2288846 | A | 5/1976 |
| FR | 2288846 | A1 | 5/1976 |
| GB | 2480616 | A | 6/2011 |
| GB | 2480616 | A1 | 11/2011 |
| GB | 2606026 | A1 | 10/2022 |
| WO | 2021086213 | A1 | 5/2021 |

OTHER PUBLICATIONS

Search Report Under Section 17, Application No. GB2105818.5, dates Oct. 22, 2021.

Communication pursuant to Rule 114(2) EPC for EP Application No. 22777176.3 (third party observations).

* cited by examiner

WINDOW DRESSING SYSTEM AND ASSEMBLY

FIELD

This disclosure relates generally to the field of window dressing systems, in particular, to window dressing systems for securing adjacent to a room-facing side of a glazing element, and to methods for securing the window dressing systems adjacent to a room-facing side of a glazing element. Furthermore, the disclosure relates to window dressing assemblies, in particular, to window dressing assemblies for securing adjacent to a room-facing side of a glazing element and to methods for securing the window dressing assemblies adjacent to a room-facing side of a glazing element, the window dressing assemblies comprising at least one window dressing system.

BACKGROUND

Window dressings have been around for centuries, with shutters and blinds providing some examples of common window dressings. The use of shutters is limited to offering a degree of privacy and style to any house or to any room in the house when fitted either on the external side or the internal side of windows, respectively. The use of blinds is also limited to offering a degree of privacy, coupled with a degree of protection against sun light (the so-called 'black-out blinds').

Whilst shutters can be fitted onto walls or window frames by means of, for example, hinges, blinds could be easily fitted using, for example, push-fit brackets which fix between the glass of a window and rubber beading on the window. Therefore, although blinds could be fitted close to a window, they may still sit proud of the window frame and may restrict some bifold doors from closing flat. This also means blinds are not suitable for sliding doors or sliding windows, such as sash windows.

Manufacturing tolerances (typically within a 3 mm manufacturer tolerance on both the width and drop of the blind) are often a key factor in how well the blinds may fit close to a window and this is true even for made-to-measure blinds.

Rising energy costs have meant that consumers (e.g., home and business owners) are becoming more conscious of making their houses or business premises more energy efficient. Whilst the shutters may provide limited noise protection, none of the shutter or blind window dressings provide adequate thermal insulation to the window they are installed against.

Many of the older houses or business (or commercial) premises currently still have single glazed windows and doors. Single glazed windows and doors can be a significant source of heat loss, particularly in older houses and business premises. As a result, consumers are investigating options for improving the thermal efficiency of their windows.

National Statistics data (English Housing Survey) showed that 15% of dwellings in England retained some single glazing in 2018. Circa 3.6 million residential properties therefore have some single glazing. Older commercial properties also often still have single glazing.

Single glazed windows are poor insulators. They increase heating costs and associated emissions relative to modern glazing. They tend to suffer from condensation as they become colder than other surfaces such as walls, which is unsightly and can lead to damp, mould and damage to window frames. Thus, single glazing can cause rooms to be colder and less comfortable than those with modern glazing.

Replacement or upgrade of the single glazing is another solution, thus a complete retrofit with double-glazed windows and frames. Apart from being prohibitively expensive (particularly for large homes or extensive business premisses), this solution may not be allowed for historic and/or listed buildings or buildings in conversation areas.

What is Secondary Glazing?

A cost-effective and viable option is to use secondary glazing. An alternative to replacing single glazing or even old, low-performance double glazing, is to upgrade it by installing an additional ("secondary") glazing system or assembly parallel to the existing ("primary") glazing assembly. This secondary glazing system or assembly is generally installed within or over the recess containing the existing glazed assembly in a parallel arrangement, thus creating a double-glazing arrangement.

A double-glazing arrangement can optimise sound proofing and thermal insulation performance of the primary glazing and it works by trapping air between the primary and secondary glazing panels.

What are the Benefits of Secondary Glazing?

By trapping a layer of air, which is a good insulator, the secondary glazing improves the thermal performance of the existing primary glazing assembly. If glass is used in the secondary glazing, it may be 'low emissivity', which further reduces heat transfer. Secondary glazing can also help close gaps or leaks from which older glazing assemblies tend to suffer, further improving thermal performance. Trapping a layer of air also improves the acoustic (external noise reducing) properties of the existing primary glazing assembly. Upgrading via secondary glazing tends to be cheaper than replacement with double or triple glazing.

How do air cavities affect double-glazing arrangement's thermal performance? The thermal performance of building materials and window assemblies is measured by "U-values". These show the heat transfer (in Watts) of a material per square meter and per degree temperature difference (in Kelvin) between the outside and inside faces of the materials or assemblies. Generally, outside faces are exposed to the external environment and inner faces to a room environment. A lower U-value indicates a slower rate of heat loss per unit area and temperature difference, and therefore a better thermal performance.

Table 1 below shows the U-values for single glazing compared to those for assemblies involving two and three glazing panes with air cavities of varying thickness. The single glazed consisted of a 4 mm thick annealed glass primary glazing pane. For the double-glazed assemblies, the secondary glazing pane is made of 2 mm thick clear acrylic. For the triple glazed assembly, the two secondary glazing panes are made of 1 mm thick clear polycarbonate. The cavities were 100% air filled.

TABLE 1

Heat transfer rates of single, double, and triple glazed window assemblies

| Selected glazing assemblies | U-value ($W/m^2K$) | U-value reduction vs. single glazing |
|---|---|---|
| Single glazed | 5.80 | — |
| Double glazed 6 mm cavity | 3.29 | 43% |
| 9 mm cavity | 3.05 | 47% |
| 11 mm cavity | 2.94 | 49% |

TABLE 1-continued

| Heat transfer rates of single, double, and triple glazed window assemblies | | |
|---|---|---|
| Selected glazing assemblies | U-value ($W/m^2K$) | U-value reduction vs. single glazing |
| 20 mm cavity | 2.71 | 53% |
| 22 mm cavity | 2.72 | 53% |
| Triple glazed 11 mm & 10 mm cavities | 2.08 | 64% |

Source: Calculated in accordance with EN ISO 10077-1:2006 and EN 673:2011

Table 1 above shows that, compared to single glazing, adding a secondary glazing panel to form just a 6 mm cavity reduces the heat transfer by 43%. A 9 mm cavity reduces the heat transfer by 47% and an 11 mm cavity by 49%. An even wider cavity improves thermal performance further, but the gains per additional unit width are minor. Roughly doubling the cavity to 20 mm reduces heat transfer by 53%, only four percentage points better than achieved by an 11 mm cavity.

Increasing the cavity beyond 20 mm increases heat transfer, as intra-cavity convection currents begin to erode thermal resistivity. Table 1 above shows that widening the cavity beyond 20 mm is undesirable from a thermal (although not acoustic) point of view, as the U-value begins to rise (from 2.71 for 20 mm to 2.72 for 22 mm).

Note that a triple glazed assembly with cavities of 11 mm and 10 mm reduces heat loss still further, by 64% compared to single glazing. The combined width of these cavities (11 mm+10 mm) is equivalent to the optimal cavity in a double-glazed arrangement, but triple glazing delivers a better thermal performance (64% heat transfer reduction vs. 53%).

U-value calculations show that the thickness of the secondary glazing pane used in the secondary glazing system only has a minor impact on thermal performance. Therefore, plastic panes of just 1-2 mm thickness can be used to minimise the overall thickness of the second glazing system or assembly, improving ease of installation and reducing system or assembly weight without materially affecting thermal performance.

Similarly, the choice of secondary glazing pane material has only second order impacts on thermal performance. Glass, acrylic, polycarbonate, PET or other suitable materials can all be used, with plastics having the advantage of lower weight, cost and brittleness.

What Types of Secondary Glazing Currently Exist?

Several forms of secondary glazing systems are popular and the secondary glazing currently in use can be divided into two types:

A: The most traditional form of secondary glazing systems are those mounted on a frame placed within a recess, thus mounted adjacent and parallel to existing primary glazing assemblies. Such systems are installed within frames attached to the primary glazing units (such as, for example, vertically sliding sash windows, hinged casement or other commonly found window types). To open, such secondary glazing systems generally either slide horizontally or vertically along tracks in the surrounding frame or employ hinges generally placed to one side of the frame.

The frames are typically constructed of aluminium but can also be made of timber or plastic to suit existing window aesthetics. They are typically professionally installed, but DIY secondary glazing kits exist to allow self-installation by homeowners. The secondary glazing frames are generally attached to recesses using screws or other fixings. The secondary glazing panes themselves are typically glass in professionally installed systems, but they can be clear plastic (polycarbonate, acrylic or other) in DIY examples.

B: A second common form of secondary glazing systems are those installed close to room-facing surfaces of recesses or parts of existing primary glazing assemblies. Most typically, such systems would attach to the room-facing surfaces of the actual window frames surrounding individual primary glazing panes, to the room-facing surfaces of staff beads or other such frames surrounding existing primary glazing assemblies or, occasionally, even to the wall immediately surrounding the entire window reveal.

Such systems are more commonly, but not always, designed for DIY installation. They generally employ clear plastic secondary panes, which are lighter, cheaper and less easily broken than glass panes. The secondary panes usually have some form of edge strip or frame which is used to secure them to the existing assembly. This is generally rigid plastic, with colours chosen to match the existing aesthetic. Commonly, this surround is attached to installation faces with screws, lugs or self-adhesive strip. Another popular fixing system employs a magnetic strip around the outside of the secondary pane to hold it in place against a metal strip on the installation face.

Several solutions for installing the secondary glazing systems or assemblies have been previously described:

AU 2013/100776 A4 discloses a relatively complex mounting means for a secondary glazing element comprising of at least one elongate member of a U-shaped profile having a pair of legs extending from the base of the elongate member. The secondary glazing element must then comprise a frame with a mounting member engaging formation having legs that engage with the legs of the elongate member.

AU 2011/101215 A4 discloses a secondary glazing element having a secondary glazing panel and at least one flexible sealing member attached directly to the outer edge of the glazing panel, the sealing member comprising a multitude of aligned bristles, a flexible rib or an AQUAMAC window sealing strip. This glazing element is best suited for attaching the secondary glazing panel to surfaces of window reveals perpendicular to the existing primary glazing assembly or the face of staff-beads and suchlike perpendicular to the existing primary glazing assembly. The glazing element might also attach to the framing surfaces immediately bordering individual glass panes, but only if these are perpendicular to the glass (not meeting the glass at an angle or with a 'bead') and the glazing element is thin enough to install against these surfaces, which are generally narrow and behind window furniture.

U.S. Pat. No. 4,409,758 B discloses a conventional magnetic double-glazing system which uses a pair of cooperating magnetic perimeter strips to fit a secondary glazing panel within a recess situated behind an existing glazing panel. In this system, the secondary glazing panel is sized so that the edges of the glazing panel are fitted in close proximity to the walls of that recess. The sides of the recess behind the existing glazing panel are fitted with magnetic strip a fixed distance behind existing glazing panel. The secondary glazing panel is also fitted with a cooperating magnetic perimeter strip around the edge of the secondary glazing panel. In use, the magnetic perimeter strip around the edge of the secondary glazing panel is brought into magnetic connection with the magnetic strip in the recess to releasably mount the secondary glazing panel within that recess.

What Problems Exist with Current Forms of Secondary Glazing?

High cost: Conventional, professionally installed secondary glazing, while generally cheaper than double or triple glazing, is still a labour-intensive intervention with significant materials costs (including glass, plastic, aluminium or other frame materials, seals and fixings) and therefore remains a relatively high-cost proposition. The cost can prove prohibitive or unattractive, and financial returns due to reduced heating costs are not compelling.

Obstruction of existing glazing assembly: many forms of secondary glazing impede the operation of the existing windows. At very least, they must be opened themselves, or even removed entirely, before the existing windows can be opened, closed or locked. They can make glazing assemblies difficult to clean and can trap dirt, insects and condensation.

Prohibitively difficult or destructive installation: low cost, budget secondary glazing kits exist, but are almost universally too difficult to install for many homeowners. Significant DIY skills, and a major investment of time and suitable tools, is required to achieve installation.

A particular difficulty is that existing window furniture can impede installation. Such window furniture can include finger pulls, sash locks and overlapping sashes, but may also include levers, alarm sensors, hinges and window blind or curtain fixings among other furniture. This is particularly the case for low-cost DIY systems designed to attach to room-facing surface of an existing window. Such furniture or arrangements require to be altered or removed to install such secondary glazing systems, which is beyond the skill or inclination of most homeowners.

Another difficulty stems from the fact that mounting surfaces may also be discontinuous (such as, for example, in the case of the staff bead) or uneven (this is often the case of older windows), thus making installation difficult.

Installing conventional secondary glazing can often damage the existing fabric of the window by drilling holes, applying non-removable components with adhesives or by moving or removing existing window furniture. Particularly in the case of period properties, where window assemblies are part of the historic fabric of the building, installation of secondary glazing can therefore be unattractive or even, in the case of listed or conservation area buildings, prohibited by planning regulations.

Taken together, these issues mean that installation of traditional systems is often prohibitively difficult or even impossible.

Unattractiveness: while the glass or plastic panes used in conventional secondary glazing are unobtrusive, aluminium or plastic frame assemblies can be large and detrimental to the aesthetics especially of period property windows, another reason why planning regulations sometimes prohibit conventional secondary glazing in listed or conservation area properties.

All forms of secondary glazing currently commercially available suffer from a combination of, or all of, the drawbacks mentioned above, which at least in part explains the large persistence of un-upgraded single glazing.

It is therefore desirable to provide a form of secondary glazing (or window dressing) which is designed for DIY installation, maintains a low cost and which:

- could be installed in a greater range of windows than existing solutions,
- is easier to install than existing solutions,
- avoids obstruction of existing window assemblies, and
- does not damage the aesthetics of existing window assemblies.

These attributes are required in a window dressing implementation that still delivers the thermal performance of conventional secondary glazing.

Furthermore, consumers, in particular business owners, are also looking at being able to increase privacy (for example a massage therapist or a beauty salon) and/or sun protection (for example a butcher or fishmonger) within their premises, as well as using the windows to display information about their businesses (for example, a bookshop may choose to hide rare books behind a display cabinet whose windows are temporarily covered).

One commonly available option is to use a self-adhesive film attached to an existing window. This option is relatively cheap as the materials are low cost and the installation can be done by the consumer. However, the film is flimsy and difficult to apply, and has a lifetime of one year, so it needs to be replaced regularly, thus increasing inconvenience and cost for the consumer.

Another option is to attach a sheet of plastic (for example Acrylic) to the inside of the window frame using a magnetic strip. This option works relatively well but can suffer from condensation problems between the glass pane of the window and the plastic sheet. In addition, the outer edge of the plastic pane is supported by a plastic strip (often made of PVC) and the extensive use of thin plastics means that the system is often perceived as being flimsy and of inferior quality.

It is therefore desirable to provide a form of window dressing which is low cost, easy to install and remove as desired and which can be customised in a straightforward manner.

SUMMARY

There is a need for a window dressing system and method for securing adjacent to a room-facing side of a glazing element using a non-invasive releasable engagement. The glazing element may be a glazing element part of an external or internal window or door assembly, such as the glazing panel of an external window or that of a bookcase.

Therefore, it is an object of at least one embodiment of the present invention to provide a window dressing system which is designed for straightforward DIY installation, maintains a low cost and which:

- could be installed in a greater range of windows and doors than existing window dressing solutions,
- is simpler to install and remove than existing solutions,
- avoids obstruction of existing window assemblies,
- does not detract from the aesthetics of existing window assemblies, and
- does not damage the fabric of existing window assemblies.

Additionally, it is an object of at least one embodiment of the present invention to provide a window dressing system which:

- delivers the thermal performance of conventional secondary glazing, and/or
- provides an increased level of privacy and sound proofing, whilst enabling sun protection and use an advertising panel.

There is a further need for window dressing assemblies and methods for securing adjacent to a room-facing side of a glazing element, the window dressing assemblies comprising at least one window dressing system.

Therefore, it is a further object of at least one embodiment of the present invention to provide a window dressing assembly which comprises at least one window dressing system and is designed for straightforward DIY installation using non-invasive releasable engagements, whilst still maintaining a low cost.

Other objects of at least one embodiment of the present invention may become apparent from the following description, which is given by way of example only.

The invention is defined by the claims.

In accordance with a first aspect of the invention, there is provided a window dressing system for securing adjacent to a room-facing side of a glazing element fitted in a mounting recess formed by a window frame, the window dressing system comprising a panel, a spacer frame at least partially surrounding the periphery of the panel, the panel being secured thereon, and a conformable securer enveloping the spacer frame, wherein a releasable engagement between the conformable securer and at least part of the window frame secures the panel of the window dressing system at a spacing away (G) from the room-facing side of the glazing element.

The advantage of having the spacer frame at least partially surrounding the periphery of the panel is that the window dressing system can be secured onto only a section of the glazing element, thus not having to cover the whole of the glazing element in order to be appropriately secured thereon. For example, the spacer frame may be secured on two opposing sides (top and bottom) of the panel in order to, in turn, secure the system to the glazing element. Thus, at least one embodiment of the present invention has the advantage of allowing consumers to add a range of desired characteristics (privacy) or functions (food menu display) to existing glazing elements.

Furthermore, employing a conformable securer enveloping the spacer frame has the advantage of allowing the window dressing system to be rapidly installed and secured using, for example, friction or adhesion, and without the need for specialist tools or DIY skills. Additionally, the conformable securer has the advantage of allowing installation of the system with virtually no damage to the window fabric and in an easily removable fashion.

The conformable nature of the securer provides the advantage of facilitating the window dressing system to adjust automatically for any measurement errors in the glazing element size or irregularities in the window frame. Additionally, or alternatively, when the spacer frame fully surrounds the periphery of the panel, the conformable nature of the securer enables the creation of an air-sealed cavity between the panel of the window dressing system and the room-facing side of the glazing element.

The window dressing system of the first aspect of the invention may comprise any one or a combination of any one of a secondary glazing system (for improving insulation of windows in private home rooms or business premises), a display panel system (for displaying information), a privacy system (for increasing privacy of windows in private home rooms or business premises) or a blackout system (fully preventing light ingress and functioning like a fitted window blind).

The spacer frame may either partially or fully surround the panel of the window dressing system, with the panel being secured onto the spacer frame.

When partially surrounding the panel, the spacer frame surrounds at least two sides of the panel in order to allow the panel to be secured onto the glazing unit using the conformable securer. The at least two sides may comprise two opposing sides of the panel (top-bottom sides to secure the system, for example, away from the left-right sides of the glazing panel or left-right sides to secure the system, for example, away from the bottom-top sides of the glazing panel) or may comprise three adjoining sides of the panel (that is, three sides sharing two corners of the panel) (top-left-bottom sides of the panel to secure the system so that it partially covers the left-side of the glazing window).

When fully surrounding the panel, the spacer frame may comprise a frame of a size (i.e., frame depth measured perpendicularly away from the panel) suitable to deliver an air cavity of optimal size to, for example, reduce window heat loss when the system is used as a secondary glazing. Additionally, or alternatively, the size of the spacer frame may be reduced (i.e., the depth of the frame may be reduced) to allow installation of the window dressing system if space constraints dictate. These space constraints may be imposed by existing window furniture fitted onto the window frame or by narrower than usual window frames.

Preferably, the spacer frame may have a depth of about 6 mm to about 16 mm and a width of about 4 mm to 20 mm. The spacer frame may be made of a rigid plastic (such as uPVC, HDPE or Polypropylene), aluminium, stainless steel or timber, and may come in a range of colours to blend in with the aesthetics of existing window frames. Alternatively, the spacer frame may be made of a flexible material, such as PVC, EVA foam, silicone rubber, natural rubber, nitrile rubber, EPDM or neoprene.

Preferably, the panel may be secured onto the spacer frame using adhesive or very high bond adhesive tape. Alternatively, the panel may be secured onto the spacer frame using mechanical fixings, such as, for example, studs, rivets, screws or push fittings. The advantage of these securing methods is that one face of the spacer frame is attached to a section of the face of the panel close to the periphery of the panel, whilst the other opposing face of the spacer frame faces the glazing element of the existing window assembly.

Preferably, the releasable engagement may be a non-invasive releasable engagement. The advantage of having a non-invasive releasable arrangement is that no damage or alteration is needed to the existing window frame in order to secure or remove the window dressing system to or from the room-facing side of the glazing element. Even if the releasable engagement were to be made employing self-adhesive tape, the removal of the window dressing system would still be non-invasive since, being a light-weight system, the adhesive does not need to be strong to secure the system to the glazing element.

More preferably, the releasable engagement may be configured as any one or a combination of a friction fit, compressible fit, abutting fit or a self-adhesive fit. The advantage of these fitting types is that the window dressing system may be easily removable to allow for repositioning, cleaning or complete removal (for example, in the summer months when secondary glazing is not typically required).

The window dressing system may therefore fit any window with at least an 11 mm clearance between the glazing element and any window furniture. As window furniture is almost always further from the glazing element than this due to the need for screws or other fixings, or space to operate furniture such as closers, locks and levers, this makes the window dressing system of at least one embodiment of the present invention suitable for almost any standard shaped window. That is, it has far greater applicability than existing double-glazing solutions, and it can be installed with a suitable cavity without the need for removing or moving window furniture.

Another advantage of these releasable engagement types is that installation of the window dressing system is quick and simple, with no tools or DIY skills required on the part of the installer, making the system more accessible than traditional approaches.

Furthermore, the existing window fabric is not damaged in any way by these releasable engagement types and the window dressing system is completely removable. This is particularly useful when upgrading window assemblies that are part of historic buildings where a desire to preserve the existing window fabric, or historic building or planning regulations, prohibit more damaging interventions or installation of other forms of secondary glazing.

Preferably, the conformable securer may envelop the spacer frame. The enveloping may comprise surrounding the periphery of the spacer frame (i.e., extending outwardly in the plane of the spacer frame), either completely (i.e., the depth of the conformable securer is roughly the same as the depth of the spacer frame) or exceeding it (i.e., the depth of the conformable securer is larger than the depth of the spacer frame). The advantage of the enveloping is that the conformable securer allows fitting the window dressing system within window frames of irregular dimensions (width, height) or depths (both of which are typical of older properties), therefore allowing the system to compensate for such irregularities.

More preferably, the conformable securer may be configured to extend onto at least a section of the periphery of the panel. This configuration may comprise allowing the conformable securer to 'spill over' from the periphery of the spacer frame onto at least a section of the periphery of the panel (i.e., the depth of the conformable securer corresponds roughly to the sum of the depth of the spacer frame and the depth of a section of the panel).

Alternatively, another configuration may comprise allowing the conformable securer to 'spill over' from the periphery of the spacer frame onto the whole of the periphery of the panel (i.e., the depth of the conformable securer corresponds roughly to the sum of the depth of the spacer frame and the depth of periphery of the panel).

The advantage of either configuration of the conformable securer is that the window dressing system can be easily inserted into any type of window frames immediately surrounding the glazing element (even those of irregular dimensions), thus allowing for errors in measuring the existing window frame and/or glazing element and for situations where existing glazing elements are not exactly of a square or rectangular shape. Especially in older windows, due to the inaccurate building methods employed in their construction, or due to settlement, expansion or contraction over time, existing windows are often slightly off true. The width or height of an existing glazing element can differ by several millimetres from one side to the other. This causes problems with some traditional window dressing systems (such as, for example, secondary glazing systems) which rely on exact sizing.

Preferably, the conformable securer may be made of a flexible, D-shaped or similar, EPDM (ethylene propylene diene monomer) sponge or similar high modulus flexible material (such as silicone sponge or natural rubber). The advantage of these material types and shapes is that the securer is resiliently compressible during the insertion and securing of the window dressing system adjacent the room-facing side of the glazing element.

When enveloping the spacer frame, or the spacer frame and at least a section or the whole of the periphery of the panel, the conformable securer may be affixed to the periphery of the spacer frame or panel using self-adherers, such as self-adhesive tape, or through use of separate dedicated adhesives. Alternatively, the conformable securer may be attached chemically to the periphery of the spacer frame or panel at the production stage when produced using a coextrusion process.

The conformable securer may have a width (as measured away from and in the plane of the periphery of the spacer frame or panel) of about 7 mm to 20 mm and a depth (as measured away from and perpendicular to the plane of the periphery of the spacer frame or panel) of about 4 mm to 20 mm. The advantage of these dimensions means that, when the conformable securer envelops the spacer frame and at least a section or the whole of the periphery of the panel, the securer may extend beyond (or overhang) the spacer frame towards the glazing element by up to 5 mm.

Additionally, these dimensions of the conformable securer have the advantage of enabling the securer to be compressed depth-wise from, for example, 13 mm down to 11 mm or 9 mm, when the window dressing system is secured within the window frame. Consequently, this arrangement means that the conformable securer are compressed against the room-facing side of the glazing element both during and after the fitting of the window dressing system within the window frame. Furthermore, for 'irregular' windows, this arrangement also allows the conformable securer to expand or contract to adjust for such irregularities. In effect, the dimensions of the conformable securer therefore that they allow for errors in measurement of +8 mm, and a difference in glazing element dimensions of up to 16 mm from one end to the other. This is sufficient to allow for almost all degrees of irregularity in even larger glazing elements. Even greater dimensional irregularities can be mitigated with minor additional interventions, and dimensions and elasticity of the conformable securer can be modified to allow for differing situations as appropriate.

Preferably, the colour of the spacer frame and/or that of the conformable securer is chosen to match existing window aesthetics. For example, when installed, a 6 mm wide spacer frame and, on average, 4 mm of the depth of the conformable securer would be visible from the room to form an overall frame depth of 10 mm. This depth is significantly thinner than most alternative secondary glazing systems, and this means that the apparent reduction in the dimensions of the glazing panel and the aesthetic impact of the window dressing system are minimal.

Preferably, the spacing away (G) (or cavity) may be configured to enable a gap distance (or cavity) between the panel of the window dressing system and the room-facing side of the glazing element of about 6 mm to 20 mm. When the window dressing system is used as secondary glazing (thus the spacer frame fully surrounds the periphery of the panel), these dimensions of the cavity have the advantage of reducing the heat transfer by 43% for a cavity of 6 mm and by 53% for a cavity of 20 mm. Increasing the cavity beyond 20 mm increases heat transfer, as intra-cavity convection currents begin to erode thermal resistivity.

More preferably, the spacing away (G) enables a fixed gap distance (or cavity). The fixed gap distance may be easily achieved since the conformable securer abuts the existing glazing element, thus ensuring that the pane of the window dressing system is secured in a parallel arrangement with the glazing element to form a cavity of trapped air with the existing glazing element. If the narrowness of the window frame or available space (due to window furniture) requires it, the conformable securer can be compressed by 2 mm, thus reducing the cavity to a minimum of 6 mm to 9 mm as dictated by the rigid spacer frame.

Alternatively, the spacing away (G) enables a variable gap distance. Preferably, the variable gap distance tapers gradually away from a mid-point towards end-points of the spacing away (G). The variable gap distance (or cavity) may be achieved when the releasable engagement is configured as any one of a friction fit, compressible fit or abutting fit and the conformable securer adjusts automatically during the securing of the panel adjacent the room-facing side of the glazing element. When, for example, friction fitted, the pane 'bulges away' from the glazing element approximately at its mid-point, thus increasing the cavity size and improving the thermal performance of the window dressing system. Furthermore, due to the spacer frame having a fixed depth, the spacer frame ensures a 'minimum' gap distance, but if the window dressing system is not pressed right up against the glazing element (and it typically does not need to be), the cavity can also be larger at the end-points of the spacing away (G), which is also beneficial. However, a typical arrangement of the window dressing system is such that the cavity is narrower at the end-points, thus the system is more likely to fit behind window furniture, whilst still maintaining a larger cavity at the midpoint and improving heat retention.

The window dressing system of the first aspect of the invention may further comprise adherers affixed to a glazing element facing side of the spacer frame. In the scenario where the window frame surfaces immediately adjacent to the glazing element are not perpendicular to the glazing element (i.e., they meet the glazing element at an angle or are otherwise shaped) or where they are too shallow to allow for the conformable securer to provide a friction fit, adherers may be used to affix the window dressing system directly to the glazing element. In this arrangement, the cavity would be about 10 mm. The glazing element is not damaged by this fixing system and, while removal of the window dressing system may be more difficult than with the friction fit method, it can still be achieved without damage to the existing window fabric.

Preferably, the adherers may be an adhesive of appropriate tack (where 'tack' in this context means 'stickiness', i.e. the adhesive would have to be sticky enough to hold the window dressing system in place, but preferably not so strong that it could never be removed), a high bond self-adhesive tape or a self-adhesive stripe.

Advantageously, the adherers may have a width (i.e., the width of the self-adherers measured in plane with the width of the spacer frame) of about 4 mm to 20 mm and a depth (i.e., the thickness of the self-adherers measured perpendicular to the plane of the spacer frame) of about 0.5 mm to 2.0 mm.

Preferably, the panel may comprise glass, plastic (such as acrylic, polycarbonate, PET), metal or insulating board material. More preferably, the panel may comprise a low-emissivity material. This is particularly advantageous when the window dressing system is used as secondary glazing.

Preferably, the panel may be transparent. Preferably, the panel may be covered with a protective coating or film. More preferably, the film may be an anti-reflective or reflective film, a scratch resistant film, an anti-glare film or a 'solar control' film.

Alternatively, the panel may opaque. Preferably, the panel may be a 'blackout' panel (i.e., a panel fully preventing light ingress, thus like a shutter). Advantageously, the blackout panel may be made of insulating board to further reduce heat loss or be provided with films or plastic sheets which may alter the primary window characteristics as desired (such as to reduce solar gain during summer or in rooms otherwise prone to excessive solar heating) in a way that is removable and easier than applying films directly to existing primary glazing elements.

Alternatively, the panel may be translucent to only partially reducing visibility through the panel.

Preferably, the panel may function as a display for pictures, decorations or information (such as, for example, restaurant menu information). As a decorative panel, the panel may be made of patterned plastic or covered with decorative films, thus allowing decoration to be applied to existing windows in an easy and removable fashion. Such decoration might extend to pictures, paintings or drawings. As a display panel, the panel may be used to display menu or other information, particularly when used in windows and doors of commercial premises. Appropriate markers would allow information to be erased and replaced.

In accordance with a second aspect of the invention, there is provided a window dressing assembly for securing adjacent a room-facing side of a glazing element fitted in a mounting recess formed by a window frame, the window dressing assembly comprising a first window dressing system releasably secured adjacent the glazing element and a second window system secured immediately adjacent the first window dressing system. The advantage of combining two (ideally identical) window dressing systems is that the two panels form a triple glazed arrangement which further improves the thermal performance of the existing glazing element.

Advantageously, the assembly employs shallow spacer frames to minimise aesthetic impact and decrease total weight.

Preferably, the second window dressing system may be secured immediately adjacent the first window dressing system via a very high bond adhesive strip or a dedicated adhesive. Alternatively, the second window dressing system may be secured immediately adjacent the first window dressing system using mechanical fixings, such as, for example, studs, rivets, screws or push fittings.

Preferably, the window dressing assembly may comprise first and second window dressing systems according to the first aspect of the invention. More preferably, the first window system may be releasably secured adjacent the glazing element via the releasable engagement of the first aspect of the invention.

In accordance with a third aspect of the invention, there is provided a method for securing a window dressing system adjacent a room-facing side of a glazing element fitted in a mounting recess formed by a window frame, the method comprising positioning the window dressing system within the mounting recess so that the window dressing system is secured at a spacing away (G) from the room-facing side of the glazing element. The securing (or installation) method is advantageously enabled by the window dressing system which is thin enough to fit behind all window furniture, allowing installation in almost any regularly shaped window without impeding the operation of any part of the existing window.

Preferably, the window dressing system may be the window dressing system according to the first aspect of the invention.

Preferably, the positioning of the window dressing system may comprises forming a releasable engagement between the conformable securer and at least part of the window frame of the mounting recess. Forming a releasable engagement has the advantage of allowing the window dressing system to be easily removable to allow for repositioning, cleaning or complete removal.

In accordance with a fourth aspect of the invention, there is provided a method for securing a window dressing assembly adjacent a room-facing side of a glazing element fitted in a mounting recess formed by a window frame, the method comprising positioning the window dressing assembly within the mounting recess so that the window dressing assembly is secured at a spacing away (G) from the room-facing side of the glazing element. The securing (or installation) method is advantageously enabled by an assembly typically employing narrow frames to minimise assembly weight and aesthetic impact. Therefore, when installed adjacent a glazing element, the method of the fourth aspect may represent a method of forming a triple glazing arrangement.

Preferably, the window dressing assembly may be the window dressing assembly according to the second aspect of the invention. Identical panels of the window dressing system may be combined to form a triple glazed arrangement with further improved thermal performance.

BRIEF DESCRIPTION OF THE DRAWINGS

Various aspects of the invention will now be described by way of example only and with reference to the accompanying drawings, of which:

FIGS. 5(*b*) and (*d*) illustrate methods of securing the window dressing assemblies of FIGS. 5(*a*) and (*c*) to windows of various designs;

DETAILED DESCRIPTION

Figure 1:
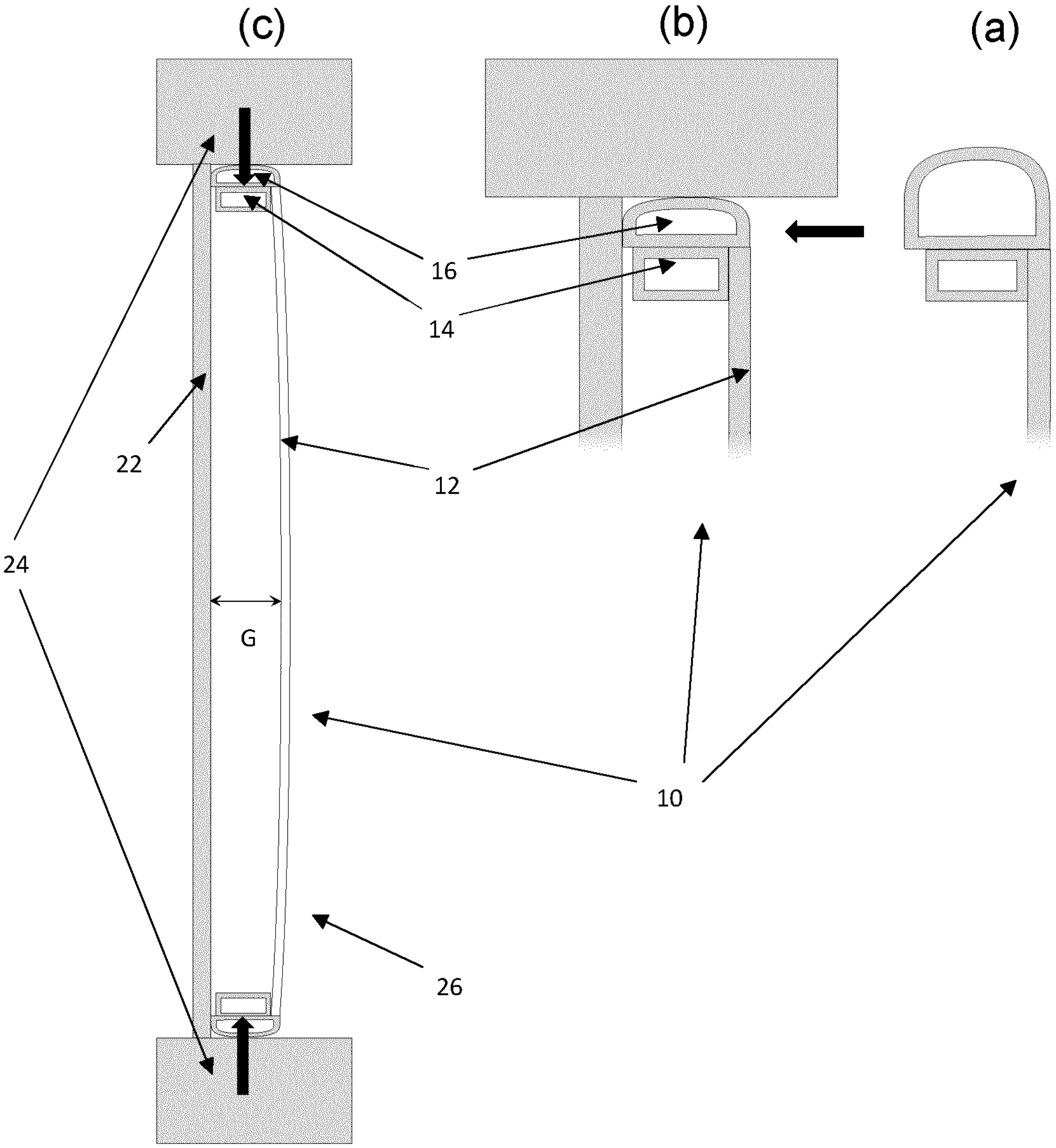
FIG. 1 shows a configuration of the window dressing system of the first aspect of the invention.

FIG. 1 shows a configuration of the window dressing system (10) of the first aspect of the invention. The core configuration of the system (10) comprises a panel (12), a spacer frame (14) surrounding the periphery of the panel (12) and conformable securer (16) enveloping the spacer frame (14). FIG. 1 also shows the glazing element (22) fitted in the mounting recess (26) formed by the window frame (24).

The panel (12) is made of thin and rigid clear plastic, such as acrylic. Acrylic has a good rigidity which makes for a durable installation of the window dressing system (10).

The panel (12) is typically 2 mm thick. However, in some system (10) installations (such as, for example, installation of smaller panels (12) or of panels (12) fitted into the recess (26) via self-adherers), the panel (12) can be 1 mm thick. The panel (12) is sized to be slightly larger (typically by about 8 mm for an average sized window, but potentially by between 4 mm and 20 mm for smaller or larger windows) than the visible glass pane of the individual glazing element (22) to allow for easy installation and removal, as well as to compensate for any window frame (24) irregularities.

The spacer frame (14) is secured onto the whole of the periphery of the panel (12) using very high bond adhesive tape. In this arrangement, one face of the spacer frame (14) is attached to the periphery of the panel (12), whilst the other opposing face of the spacer frame (14) faces the glazing element (22). The spacer frame (14) is made of rigid plastic (such as uPVC) which comes in a range of colours to blend in with the aesthetics of the existing window frame (24). Alternatively, the spacer frame (14) is made of aluminium (which is more rigid than uPVC) when fitted against glazing elements (22) about or larger than 1.25 $m^2$. The spacer frame (14) has a depth of 9 mm and a width of approx. 6 mm.

The conformable securer (16) is a D-shaped EPDM sponge (16) provided with a self-adhesive strip for affixing to both the periphery of the spacer frame (14) and that of the panel (12). The sponge (16) has a width of 10 mm and a depth of 13 mm. In the embodiment of FIG. 1, the sponge (16) therefore extends beyond (or overhangs) the spacer frame (14) towards the glazing element (22) by about 2 mm. For smaller panels (12), the sponge (16) would have a width of 7 mm and a depth of 8 mm.

Based on the above-mentioned dimensions of parts of the core configuration for a typical system (10), the window dressing system (10) has a total depth of 13 mm (calculated as the sum of the 9 mm depth of the spacer frame (14), the 2 mm thickness of the panel (12) and the 2 mm overhang of the sponge (16)), compressible to 11 mm when the system (10) is installed in the window frame (24).

The releasable engagement between the sponge (16) and the window frame (24) is a friction fit, thus the panel (12) is secured in an optimal installing position by compressing the sponge (16) against the walls of the window frame (24).

Figure 4:
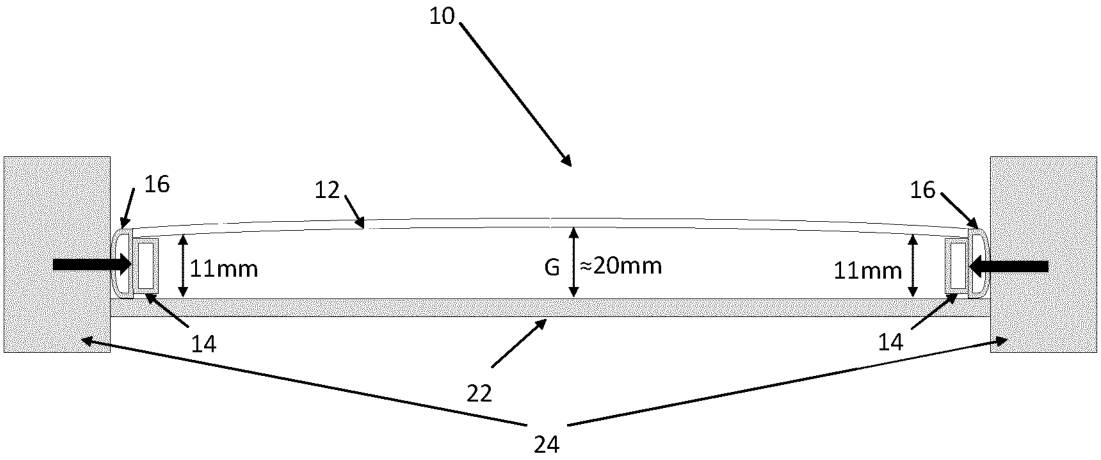
FIG. 4 shows a configuration of the window dressing system of the first aspect of the invention with a variable gap distance (G)

FIG. 1 also shows the spacing away (G) created between the panel (12) and the glazing element (22). In this configuration, the spacing away (G) enables a variable gap distance (or cavity). As can be seen from FIG. 4, the variable gap distance tapers away from approx. 20 mm at the mid-point of the spacing away (G) to approx. 11 mm at both end-points of the spacing away (G). In use, the variable cavity is formed during the friction-fitting process of the system (10) when the thin panel (12) bulges away from the glazing element (22) in the middle of the spacing away (G). The existence of the variable cavity further improves the thermal performance of the system (10).

Figure 2:
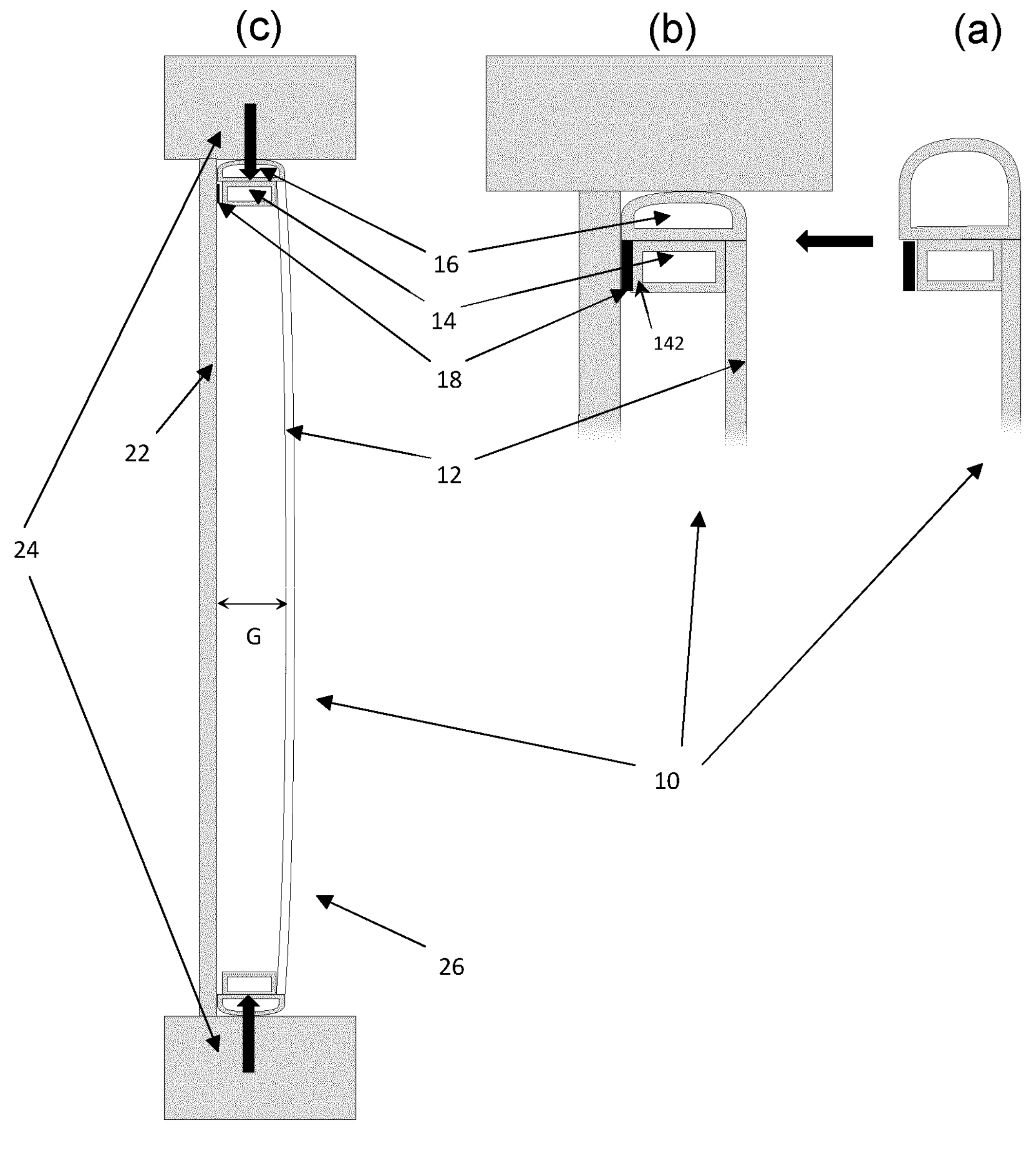
FIG. 2 shows another configuration of the window dressing system of the first aspect of the invention.

FIG. 2 shows another configuration of the window dressing system (10) of the first aspect of the invention. The core configuration is the same as that shown in FIG. 1, hence the same reference numerals have been used to indicate like-parts of the system (10).

As seen from FIG. 2, the system (10) is shown to further comprise an adherer (18) affixed to a glazing element facing side (142) of the spacer frame (14). The adherer (18) is a self-adhesive strip (18) having a width of 6 mm and a depth of 1 mm.

In this configuration, where the window frame (24) surfaces immediately adjacent to the glazing element (22) are not perpendicular to the glazing element (22) (i.e., they meet the glazing element (22) at an angle or are otherwise shaped) or where they are too shallow to allow for the sponge (16) to provide a friction fit, the self-adhesive strip (18) is used to affix the window dressing system (10) directly to the glazing element (22). In this arrangement, the spacing away (G) enables a fixed gap distance (or cavity) of about 10 mm.

Figure 3:
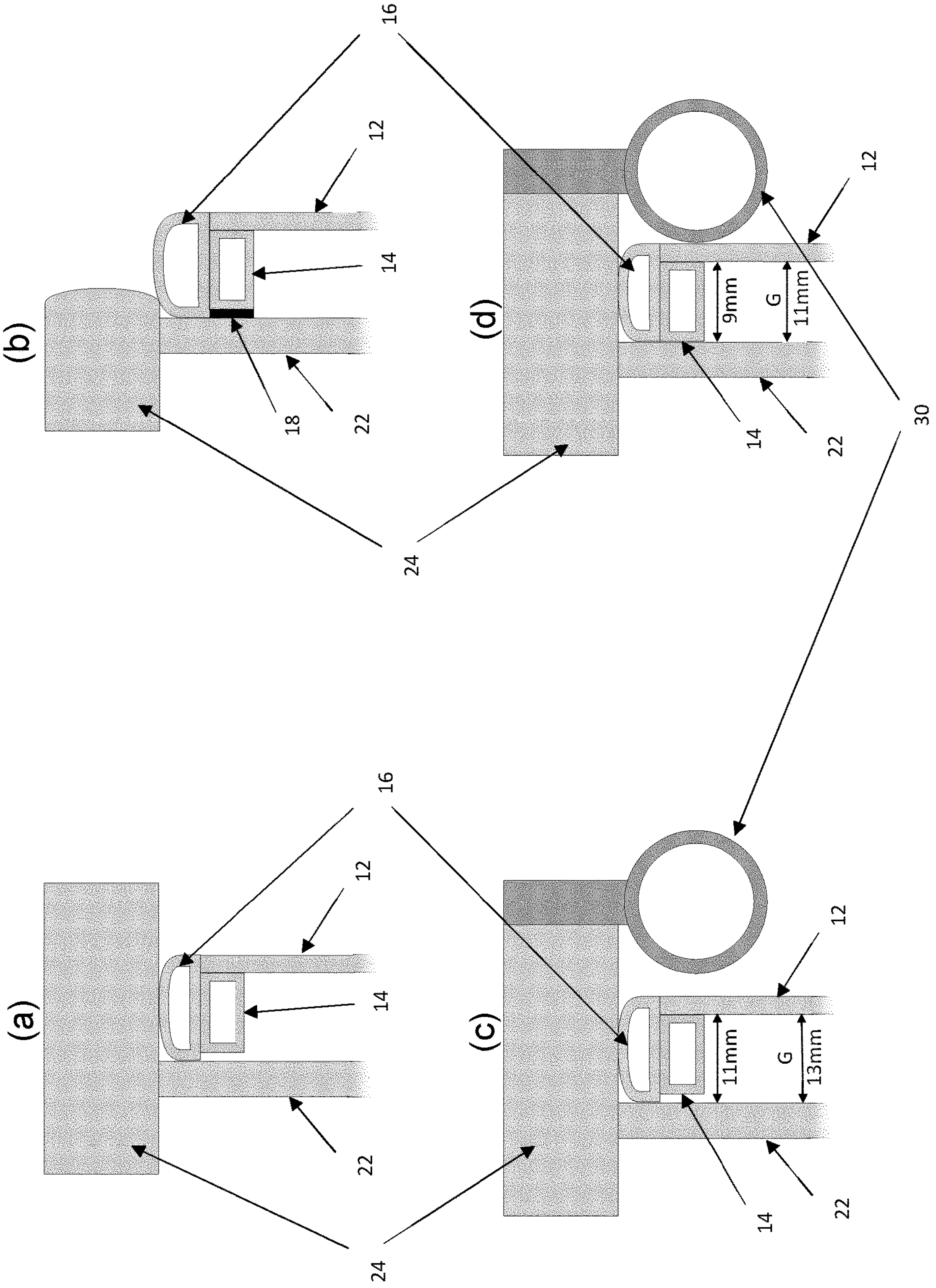
FIGS. 3(*a*)-(*d*) illustrate methods of securing the window dressing system of the first aspect of the invention to windows of various designs.

FIGS. 3(*a*) and (*c*)-(*d*) illustrate methods of securing the window dressing system (10) of FIG. 1, whereas FIG. 3(*b*) illustrates a method of securing the window dressing system (10) of FIG. 2 to windows of various designs. Same reference numerals have been used to indicate like-parts as those in FIGS. 1 and 2. All of these methods demonstrate how the flexible sponge (16) surround allows effortless and convenient installation of the system (10) when clearance is limited by window furniture (30).

FIG. 3(*a*) illustrates how, when installed, the sponge (16) compresses against the inside face of the existing window frame (24) so that the friction between the sponge (16) and the window frame (24) holds the window dressing system (10) in place in a manner that is secure, yet removable.

Unlike some fixed secondary glazing systems, the system (10) of FIG. 3(*a*) is easily removed completely at times (such as on very warm days) when an improved thermal performance is unwanted.

When window furniture (30) is present, the sponge (16) abuts the existing glazing element (22), ensuring that the window dressing system (10) forms a cavity of trapped air of, usually, 11 mm with the glazing element (22), as shown in FIG. 3*c*. If the narrowness of the window frame (24) or available space (due to window furniture (30)) requires it, the sponge (16) can be compressed by 2 mm, reducing the cavity to a minimum of 9 mm as dictated by the rigid spacer frame (14) as shown in FIG. 3*d*.

In the case where window frame (24) surfaces immediately adjacent the glazing element (22) are not perpendicular to the glazing element (22) or where they are too shallow to allow for the sponge (16) to provide a friction fit, high bond self-adhesive tape (18) is used to affix the window dressing system (10) directly to the glass surface of the glazing element (22). As shown in FIG. 3*d*, this arrangement delivers a cavity of 10 mm. The glass surface is not damaged by this fixing system, and while removal of the window dressing system (10) is more difficult than with the friction fit method, it can still be achieved without damage to the existing window fabric.

Because the window dressing system (10) sits immediately against the glazing element (22) and behind any existing window furniture (30), unlike traditional systems, the system (10) of FIGS. 3(*c*)-(*d*) does not impede operation of the existing windows. Furthermore, the window dressing system (10) does not require to be moved or removed prior to opening the existing window. Existing finger pulls, locks, closers and other window furniture will operate as normal in an unimpeded fashion.

Figure 5:
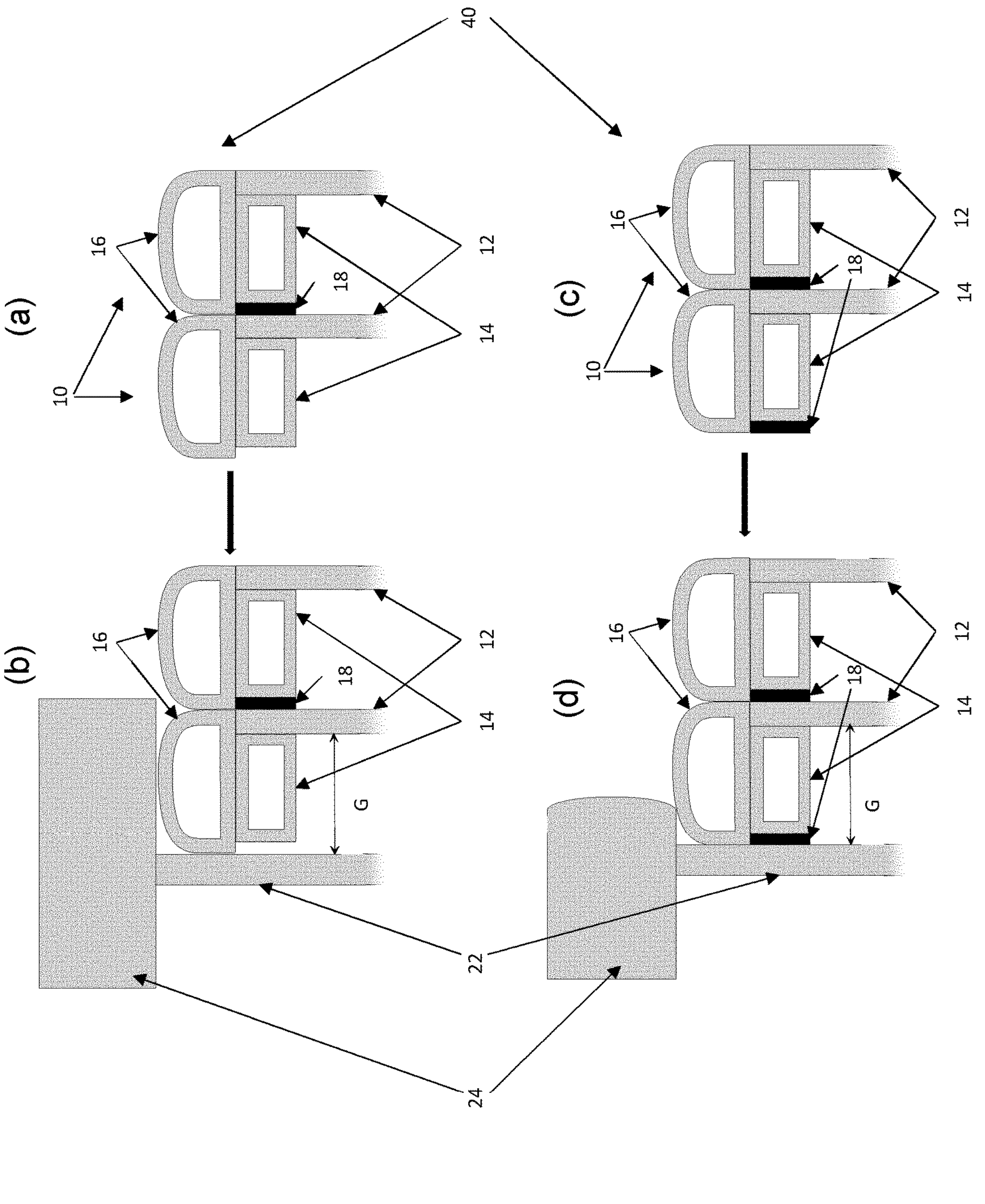
FIGS. 5(*a*) and (*c*) show configurations of the window dressing assembly of the second aspect of the invention.

FIGS. 5(*a*) and (*c*) show two configurations of the window dressing assemblies (40), whilst FIGS. 5(*b*) and (*d*) illustrate methods of securing the two window dressing assemblies (40) of FIGS. 5(*a*) and (*c*) to windows of various designs.

As it can be seen from either of FIG. 5(*a*) or (*c*), two identical window dressing systems (10) are combined such that, when installed against the glazing element (22) (as shown in FIGS. 5(*b*) and (*d*)), a triple glazed arrangement is formed with further improved thermal performance. The two identically sized window dressing systems (10) have been combined (i.e., the first window dressing system has been secured onto the second window dressing system) using the very high bond adhesive strip (18). The same adhesive strip (18) is also used when securing a window dressing assembly (40) to a window frame (24) of an irregular design.

Figure 6:
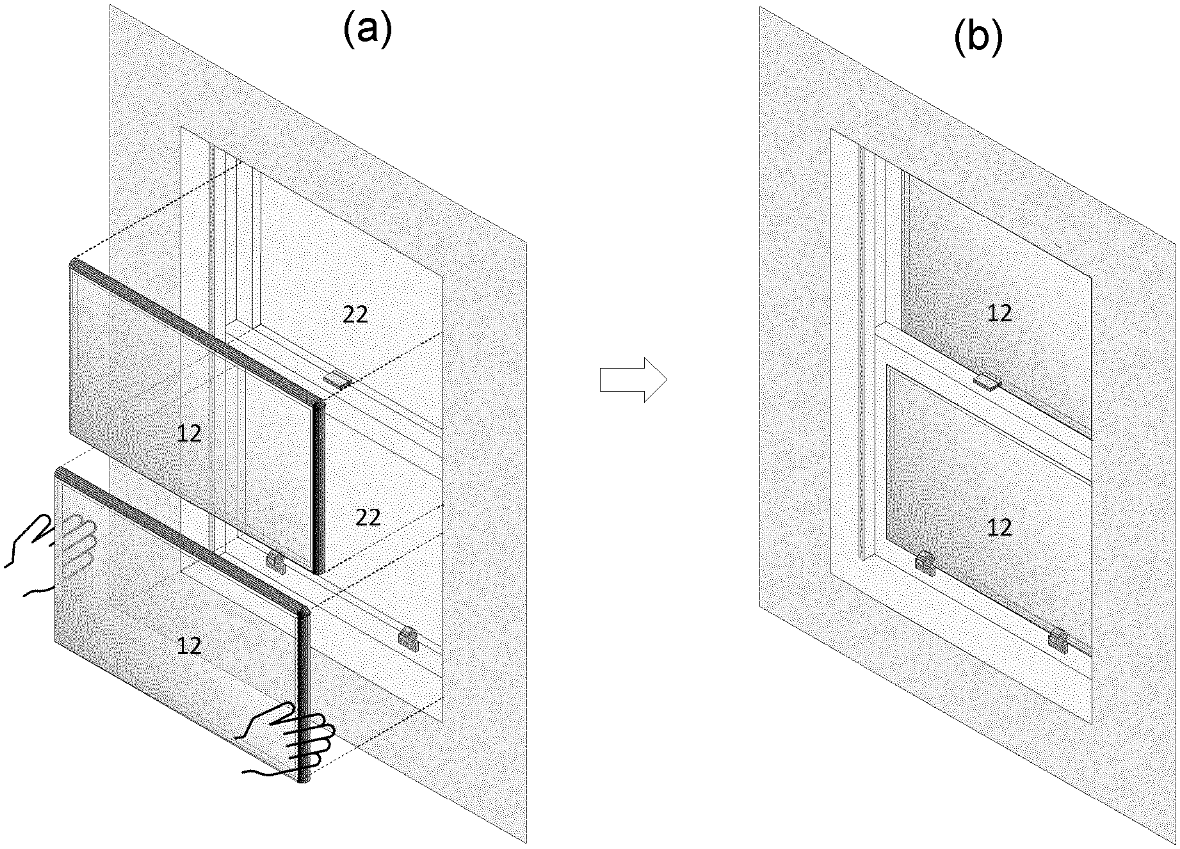
FIGS. 6(*a*) and (*b*) illustrate methods of installing the window dressing system of the first aspect of the invention or the window dressing assembly of the second aspect of the invention to existing glazing elements.

FIGS. 6(*a*) and (*b*) illustrate methods of installing the window dressing system (10) of either of FIGS. (1) to (4) or the window dressing assembly (40) of FIG. 5 to existing glazing elements (22).

FIG. 6(*a*) demonstrates the way in which the window dressing system (10) or assembly (40) is sized for, and installed into, an existing primary window assembly. Panels (12) are constructed to measure circa 10 mm larger than each individual glazing element (22). In the scenario shown in FIG. 6, two separate systems (10) or assemblies (40) are required, but in other instances, more or fewer window dressing systems (10) or assemblies (40) may be employed depending upon the number of glazing elements (22) present in the existing primary window assembly. FIG. 6(*a*) shows the systems (10) or assemblies (40) prior to installation, whereas FIG. 6(*b*) shows the systems (10) or assemblies (40) after installation.

In use, the systems (10) or assemblies (40) are inserted into the window frames (24) immediately surrounding the existing glazing elements (22) as per FIG. 6(*a*). The sponge (16) (no shown) then compresses against the inside face of the existing window frames (24) to allow installation as shown in FIG. 6(*b*), and the friction between the sponge (16) and the window frame (24) holds the window dressing systems (10) or assemblies (40) in place adjacent to a room-facing side of a glazing element (22) in a manner that is secure yet removable.

Figure 7:
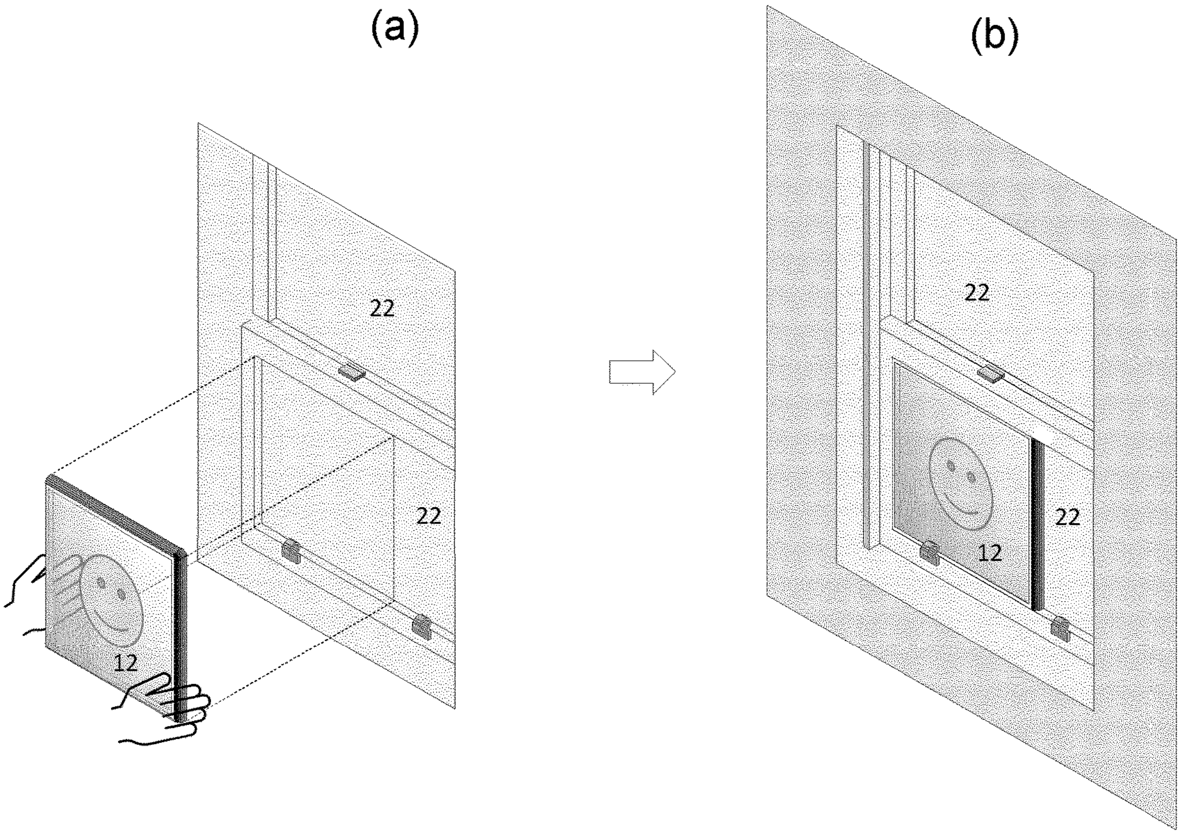
FIGS. 7(*a*) and (*b*) illustrate a method of installing an alternative embodiment of the window dressing system of the first aspect of the invention to an existing glazing element.

FIGS. 7(*a*) and (*b*) illustrate a method of installing an alternative embodiment of the window dressing system (10) to an existing glazing element (22). FIG. 7(*a*) shows a system (10) sized to cover only a section of the existing primary glazing element (22). In this embodiment, the spacer frame (14) (not shown) only partially surrounds the periphery of the panel (12) so that the window dressing system (10) can be secured onto only a section of the glazing element (22), thus not having to cover the whole of the glazing element in order to be appropriately secured thereon. In the embodiment of FIG. 7(*a*), the spacer frame (14) is secured on two opposing sides (top and bottom) of the panel (12, as well as onto the left side of the panel (12).

Whilst it is obvious that this alternative embodiment of the window dressing system (10) cannot be used to function as secondary glazing, the system (10) is used for decoration, as information display or for privacy.

Although exemplary embodiments have been described in the preceding paragraphs, it should be understood that variations may be made to the above window dressing systems and assemblies without departing from the scope of the appended claims. It should thus be noted that the subject matter contained in the above specification or shown in the accompanying drawings should be interpreted as illustrative and not in a limiting sense. Each feature disclosed in the specification, including the claims and drawings, may be replaced by alternative features serving the same, equivalent or similar purposes, unless expressly stated otherwise.

Unless the context clearly requires otherwise, throughout the description and the claims, the words 'comprise', 'comprising', and the like, are to be construed in an inclusive, as opposed to an exclusive or exhaustive, sense; that is to say, in the sense of 'including, but not limited to'.

Any combination of the above-described features in all possible variations thereof is encompassed by the present invention, unless otherwise indicated herein or otherwise clearly contradicted by context.

The following claims are intended to cover all generic and specific features described therein, as well as all statements of the scope of the present invention which, as a matter of language, might be said to fall therebetween.

The invention claimed is:

1. A window dressing system for securing adjacent to a room-facing side of a glazing element fitted in a mounting recess formed by a window frame, the window dressing system comprising:

a panel, a spacer frame at least partially surrounding the periphery of the panel, the panel being secured thereon, wherein one face of the spacer frame is arranged to be secured to the periphery of the panel, while the opposing face of the spacer frame is arranged to face, and be fitted against, the glazing element, and a conformable securer enveloping the spacer frame, wherein a releasable engagement between the conformable securer and at least part of the window frame secures the panel of the window dressing system at a spacing away from the room-facing side of the glazing element, and wherein the spacing away is configured to enable a gap distance between the panel of the window dressing system and the room-facing side of the glazing element of 6 mm to 16 mm.

2. The window dressing system of claim 1, wherein the releasable engagement is a non-invasive releasable engagement.

3. The window dressing system of claim 1, wherein the releasable engagement is configured as any one or a combination of a friction fit, compressible fit, abutting fit, or a self-adhesive fit.

4. The window dressing system of claim 1, wherein the conformable securer is configured to extend onto at least a section of the periphery of the panel.

5. The window dressing system of claim 1, wherein the depth of the conformable securer is at least the same as the depth of the spacer frame.

6. The window dressing system of claim 1, wherein the spacing away enables a fixed gap distance.

7. The window dressing system of claim 1, wherein the spacing away enables a variable gap distance.

8. The window dressing system of claim 7, wherein the variable gap distance tapers gradually away from a mid-point towards end-points of the spacing away.

9. The window dressing system of claim 1, further comprising adherers affixed to a glazing element facing side of the spacer frame.

10. The window dressing system of claim 1, wherein the panel comprises glass, plastic, metal, or insulating board material.

11. The window dressing system of claim 1, wherein the spacer frame completely surrounds the periphery of the panel.

12. The window dressing system of claim 11, wherein the conformable securer completely surrounds the periphery of the spacer frame.

13. A method for securing a window dressing system against a room-facing side of a glazing element fitted in a mounting recess formed by a window frame, the method comprising:

positioning the window dressing system within the mounting recess and fitting the window dressing system against the glazing element so that a panel of the window dressing system is secured at a spacing away (G) from the room-facing side of the glazing element.

14. The method of claim 13, wherein the window dressing system comprises:

the panel, a spacer frame at least partially surrounding the periphery of the panel, the panel being secured thereon, and a conformable securer enveloping the spacer frame, wherein a releasable engagement between the conformable securer and at least part of the window frame secures the panel of the window dressing system at a spacing away from the room-facing side of the glazing element, and wherein the spacing away is configured to enable a gap distance between the panel of the window dressing system and the room-facing side of the glazing element of 6 mm to 16 mm.

15. The method of claim 14, wherein the positioning of the window dressing system comprises forming a releasable engagement between the conformable securer and at least part of the window frame of the mounting recess.

16. A method for securing a window dressing assembly against a room-facing side of a glazing element fitted in a mounting recess formed by a window frame, the method comprising:

positioning the window dressing assembly within the mounting recess and fitting the window dressing assembly against the glazing element so that a panel of the window dressing assembly is secured at a spacing away from the room-facing side of the glazing element.

17. The method of claim 16, wherein the window dressing assembly comprises:

a first window dressing system releasably secured adjacent the glazing element, and a second window system secured immediately adjacent the first window dressing system and secured onto the first window dressing system such that a triple glazed arrangement is formed when the window dressing assembly is fitted in the mounting recess.

18. A window dressing assembly for securing adjacent a room-facing side of a glazing element fitted in a mounting recess formed by a window frame, the window dressing assembly comprising:

a first window dressing system arranged to be releasably secured to, and fitted against, the glazing element, and a second window system secured immediately adjacent the first window dressing system and secured onto the first window dressing system such that a triple glazed arrangement is formed when the window dressing assembly is fitted in the mounting recess and against the glazing element.

19. The window dressing assembly of claim 18, wherein the first window dressing system comprises:

a first panel, a first spacer frame at least partially surrounding the periphery of the first panel, the first panel being secured thereon, and a first conformable securer enveloping the first spacer frame, wherein a first releasable engagement between the first conformable securer and at least part of the window frame secures the first panel of the window dressing system at a spacing away from the room-facing side of the glazing element, wherein the spacing away is configured to enable a gap distance between the panel of the window dressing system and the room-facing side of the glazing element of 6 mm to 16 mm, and wherein the second window dressing system comprises:

a second panel, a second spacer frame at least partially surrounding the periphery of the second panel, the second panel being secured thereon, and a second conformable securer enveloping the second spacer frame, wherein a second releasable engagement between the second conformable securer and at least part of the window frame secures the second panel of the window dressing system at a spacing away from the room-facing side of the glazing element.

20. The window dressing assembly of claim 18, wherein the triple glazed arrangement is the first window dressing system, the second window system, and the glazing element, each positioned one over another.

* * * * *